Patented June 2, 1936

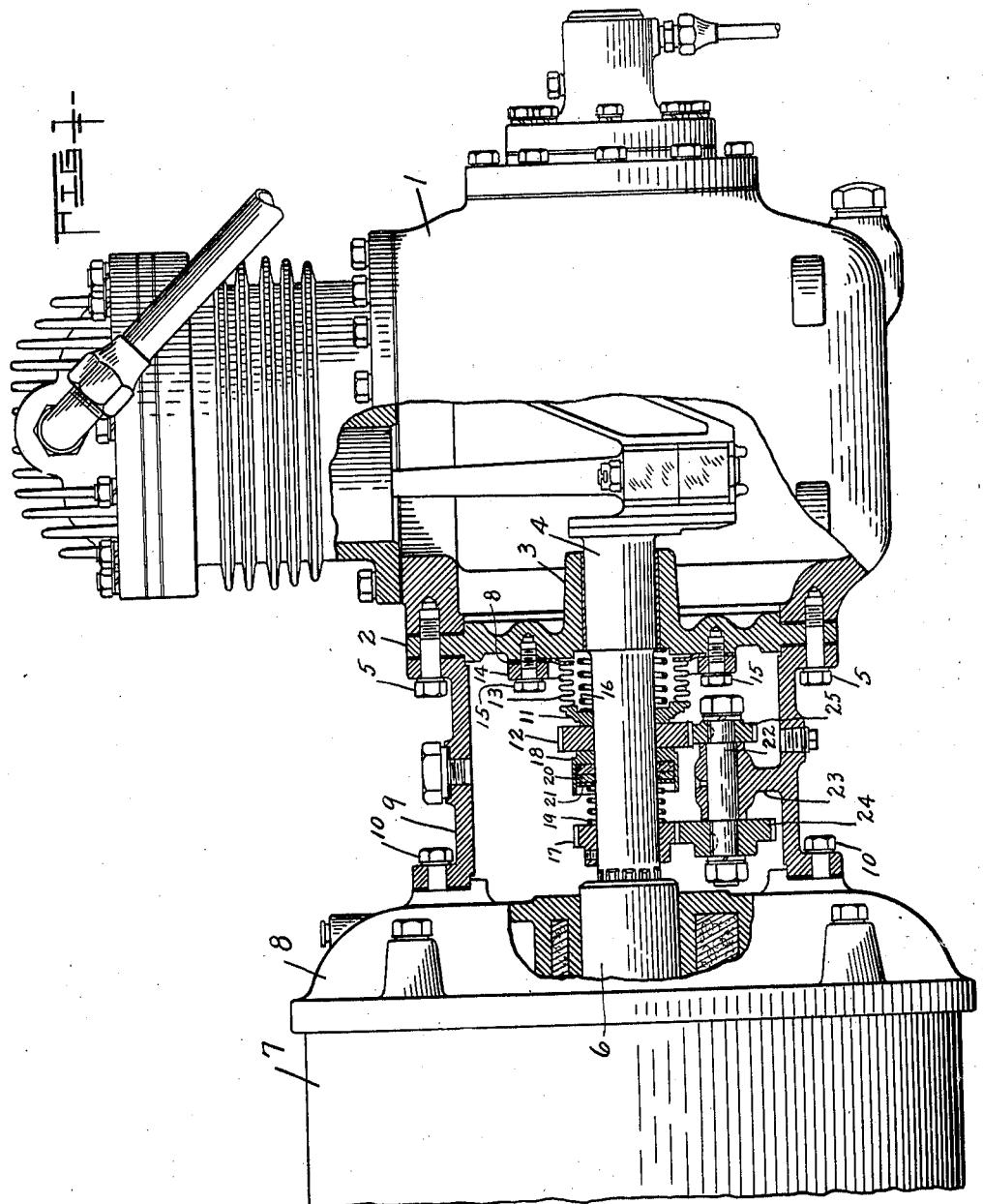

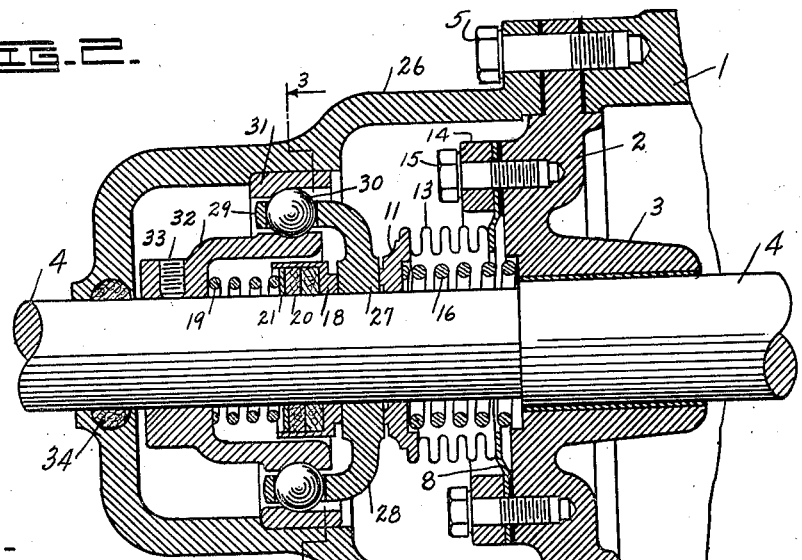
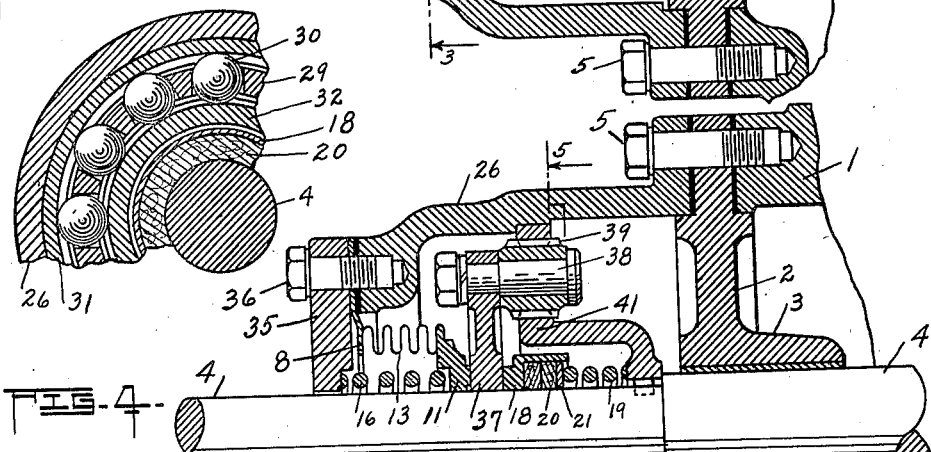
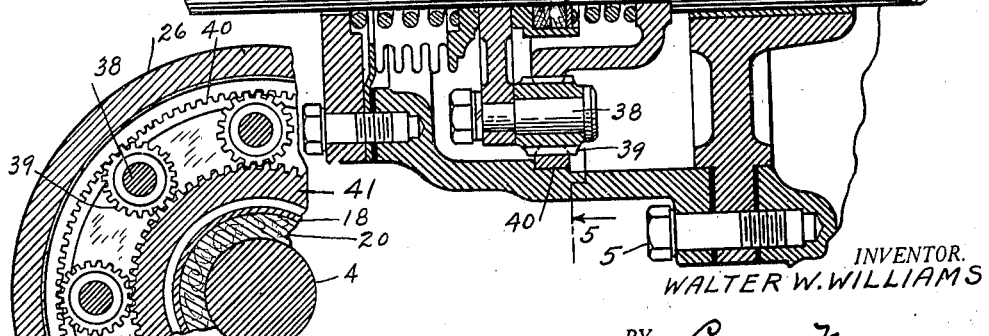

2,042,691

UNITED STATES PATENT OFFICE 2,042,691

STUFFING BOX

Walter W. Williams, Bloomington, Ill.

Application August 30, 1934, Serial No. 742,115

5 Claims. (Cl. 286—11)

This invention relates to improvements in stuffing boxes and more particularly to a stuffing box adapted to provide a liquid or gaseous seal about a shaft rotating therein.

In compressors or other devices in which a rotating shaft passes through a bearing wherein the pressure is greater upon one side than upon the other, it is necessary to provide a stuffing box of the character described.

It is an object of this invention to provide a stuffing box particularly adapted for application about a rotating shaft of devices creating an internal pressure within a compression chamber in which the shaft enters the said chamber for the purpose of operating a compression device. It is another object of this invention to provide a stuffing box which, by its construction, will form a gas and liquid-tight seal for the rotating shaft without creating undue friction upon the contacting parts.

While preferred forms of this invention are illustrated upon the accompanying sheets of drawings, yet it is to be understood that detail changes may be made without departing from the scope thereof. Furthermore, while the application of the preferred forms of this invention are illustrated in connection with a compression type of refrigerating apparatus, it is not restricted to this application and the invention may be applied in other devices where similar conditions exist.

In the drawings:

Figure 1 is a view partly in section and partly in side elevation illustrating the application of this invention to a motor-driven compressor forming a part of a compression type refrigerating apparatus.

Figure 2 is an enlarged fragmentary detail view, partly in central vertical section and partly in side elevation, of a modified form of this invention.

Figure 3 is a fragmentary view in section taken on the line 3—3, Figure 2, looking in the direction of the arrows.

Figure 4 is a view similar to Figure 3 of another modification of this invention.

Figure 5 is a fragmentary view in section taken on the line 5—5 of Figure 4.

The embodiment of this invention, as shown in Figure 1, illustrates the crank case 1 of a compression type refrigerating apparatus having a cover plate 2 supporting a bearing block 3 through which the crank shaft 4 passes. This is conventional construction and the cover plate is secured to the casing by cap screws 5. The crank shaft 4 of the compressor is extended beyond the bearing block and is provided with a splined connection to the driving shaft 6 of the motor 7, the driving shaft 6 passing through end bell 8 of the motor. The portion of the crank shaft 4 between the end bell of the motor and the cover plate 2 of the compressor is surrounded by a casing 9 which is connected to the exterior side of the cover plate 2, preferably by the same cap screws 5 employed to secure the cover plate in place. The casing 9 is secured to the end bell 8 of the motor by similar cap screws 10. It is preferable to insert gaskets between the contacting portions of the casing 9, end bell 8, and cover plate 2, as well as between contacting portions of the cover plate 2 and the crank case 1. As shown, the bearing block 3 extends inwardly from the cover plate 2, and the outer flat surface of the cover plate is preferably provided with an annular depression about the crank shaft 4.

The improved stuffing box includes a circular bearing member or seal 11 surrounding the crank shaft 4 and having a bearing surface adapted to engage and bear against a similar bearing surface upon an idle gear 12, also mounted upon the crank shaft and allowing the crank shaft to rotate therein. The periphery of the circular bearing member 11 is connected to the end convolution of a metallic bellows 13 in which the opposite end convolution is secured to a circular collar plate 8, which in turn is secured upon the outer surface of the cover plate 2 by an annular clamping member 14 and cap screws 15. The circular bearing member 11 is normally held with its bearing surface in engagement with the bearing surface of the idle gear 12 by a coil spring 16 surrounding the crank shaft 4 within the bellows 13 with one end in engagement with the bottom of the annular depression in the cover plate and the other end in engagement with the bottom of an annular depression upon the interior of the bearing member. A fixed gear 17 is secured to rotate with the shaft 4 at a distance from the idle gear 12. The adjacent surface of the idle gear 12 is provided with a bearing surface, and a circular bearing member 18 having a bearing surface adapted to engage the adjacent bearing surface of the idle gear 12 is mounted loosely upon the crank shaft 4 and is normally held in engagement with the idle gear 12 by the coil spring 19 surrounding the crank shaft 4 and bearing with one end against the fixed gear 17. It is preferable to provide the circular bearing member 18 on the side adjacent the fixed gear 17 with an annular recess to receive packing rings 20 and a follower plate 21 against which the other end of the spring 19 bears. The circular bearing members 11 and 18 having bearing surfaces in engagement with the idle gear 12, together with the bellows 13 and packing rings 20, form a seal to prevent the escape of pressure about the crank shaft 4 from within the crank case 1.

As the motor driving shaft 6 is rotated at a high rate of speed, and if the bearing member 11 is stationary and the member co-acting therewith to form the seal is rotated at the same high rate of speed against the surface of the bearing member 11, a high degree of friction is set up between the rotating part and the stationary part, which is detrimental to the bearing surfaces. In seals of this character, the bearing surfaces of both rotating and stationary members are customarily lapped surfaces and, upon being subjected to a high degree of friction, quickly wear to such a degree as to allow leakage and defeat the purpose of the seal. In order to reduce this friction and yet maintain the proper seal, this invention contemplates causing the idle gear 12 to rotate in engagement with the bearing surface of the bearing member 11 at a less rate of speed than that of the crank shaft.

In the form shown in Figure 1, a shaft 22 is mounted in a bearing 23 extended upward from the bottom of the casing 9 so that the shaft rotates with its axis parallel to the axis of the crank shaft 4 in the space therebelow. A gear 24 is keyed upon one end of the shaft 22 to mesh with the gear 17 fixed to rotate with the crank shaft 4. Another gear 25 is keyed upon the other end of the shaft 22 to mesh with the idle gear 12 so that when the compressor is in operation, the rotation of the crank shaft 4 will impart through fixed gear 17 and fixed gear 24 rotation of the shaft 22 which, in turn, will impart through the fixed gear 25 a rotation to the idle gear 12 about the crank shaft 4. By the construction of the gears 17, 24, 25, and 12 in the proper relation, the rate of rotation of the idle gear 12 may be reduced in comparison with the rate of rotation of the crank shaft 4 so that the seal may be maintained between the circular bearing member 11 and idle gear 12 with sufficient friction to maintain an efficient seal without creating detrimental results, and at the same time maintain a similar seal between the idle gear 12 and the bearing member 18. If desired, the parts within the casing 9 may rotate in a bath of lubricant.

In the modifications shown in Figures 2 and 4, the crank shaft 4 of the compressor is mounted in the bearing block 3 on a closure plate 2 secured to the crank case 1 in the same manner as disclosed in Figure 1. In these forms, however, the improved sealing device or stuffing box is contained within a casing 26 mounted in the same manner upon the closure plate 2 and surrounding the exterior portion of the crank shaft 4 in the same manner as the casing 9 of Figure 1, but in these forms the crank shaft 4 extends beyond the casing and is adaptable to be driven by a pulley, not shown, instead of by direct connection to the motor-driving shaft.

In the form shown in Figures 2 and 3, the bellows 13 is attached to the cover plate 2 and circular bearing member or seal 11, and mounts the spring 16 in the same manner as shown in Figure 1. In this form the circular bearing member or seal 11 is provided with a bearing surface adapted to engage and bear against a similar bearing surface upon a circular member 27, which is connected by radially extending arms 28 bent at right angles to engage a ball retainer 29 positioning a plurality of ball bearings 30 between an outer ball race 31 secured to the wall of the casing 26 and an inner ball race 32, which ball races are concentric to the axis of the crank shaft 4. The inner ball race 32 is fixed upon the shaft 4 and caused to rotate with it by the set screw 33. This inner ball race is recessed upon the side adjacent the member 27 to receive a circular bearing member 18 having a bearing surface adapted to engage a similar bearing surface on the member 27 opposite the bearing surface engaged by the circular bearing member 11. The bearing member 18 is normally held in engagement with the member 27 by the coil spring 19 surrounding the crank shaft 4 and bearing with one end against the bottom of the recess in the ball race 32. The bearing member 18 is recessed on the side adjacent the ball race 32 in the same manner as shown in Figure 1 to receive packing rings 20 and a follower plate 21 against which the other end of the spring 19 bears. The circular bearing members 11 and 18, having bearing surfaces in engagement with the member 28, together with the bellows 13 and packing rings 20, form a seal to prevent the escape of pressure about the crank shaft 4 from within the crank case 1.

By constructing the ball races 31 and 32 and ball bearings 30 in the proper dimensions, the rotation of the ball race 32 through the ball retainer 29 will impart a rotation to the member 27 at a lesser rate of speed than that of the crank shaft so that the seal may be maintained between the bearing member 11 and the member 27 with sufficient friction to maintain an efficient seal without creating detrimental results and at the same time maintain a similar seal between the member 27 and the bearing member 18. If desired, the parts within the casing may be rotated in a bath of oil and it is, therefore, preferable to provide an ordinary packing ring 34 about the crank shaft 4 where it passes through the exterior of the casing 26.

In this type of stuffing box mounted in the casing 26, carried on the closure plate 2, it is not necessary to secure the bellows 13 to the closure plate 2, as it might be secured to the opposite end of the casing, and the seal maintained.

In the form shown in Figures 4 and 5, the bellows 13 is secured between a closure plate 35 and the casing 26 by the cap screws 36, and the inner surface of said plates surrounding the shaft opening is preferably recessed upon the inner side for engagement with the spring 16 surrounding the shaft and bearing against the circular bearing member 11, which is secured to the bellows 13 in the same manner as described in Figure 1. In this form, the circular bearing member 11 is provided with a bearing surface engaging a similar bearing surface upon a member 27 mounted to rotate upon the crank shaft 4. In this form, the bearing member 37 is in the form of a circular plate which mounts a plurality of equally spaced apart pivoted pins 38 extending at an equal distance from the axis of the crank shaft 4 and at right angles to the plate 37 in the direction of the closure plate 2 of the crank case 1. These bearing pins mount pinions 39 which travel between an outer internal ring gear 40 secured to the wall of the casing 26 and a gear 41 which is keyed to rotate with the crank shaft 4. In this type, it is preferable to provide a shoulder in the crank shaft 4 within the casing 26 against which the gear 41 rests. The gear 41 is recessed to receive a circular bearing member 18 having a bearing surface adapted to engage a corresponding bearing surface on the member 37 opposite that engaged by the circular bearing ring 11. The bearing ring 18 is preferably recessed to receive packing rings 20 and a follower plate 21 against which a coil spring 19 surrounding the crank shaft 4 bears with the other end of the spring bearing against the bottom of the recess in gear 41.

By constructing the internal ring gear 40, pinions 39 and gear 41, in the proper proportions, the speed of rotation of the shaft 4 is transmitted through these gears and pinions to the plate 37 forming the bearing member between the bearing surfaces of the bearing members 11 and 18 at such a reduced rate to produce sufficient friction to maintain an efficient seal without creating detrimental results and at the same time maintaining a similar seal between the member 37 and the bearing member 18. If desired, the parts within the casing 26 may rotate in a bath of oil and in the form shown the bellows 13 forms a sufficient seal to omit the packing rings in the closure plate 35. It is understood that the position of the parts in this type may be reversed; that is, arranged in the position shown in Figure 2, if so desired.

What I claim is:

1. A stuffing box for a rotating shaft including a circular bearing member freely mounted upon the shaft and held against rotation therewith, a second circular bearing member freely mounted upon the shaft capable of rotation therewith, an intermediate circular bearing member freely mounted upon the shaft, and power driving means actuated by the rotation of the shaft to impart rotation to the intermediate bearing member at a lesser speed than that of the shaft, and wherein said actuating means includes an operating member keyed to the shaft cooperating with a reduced speed transmission cooperating with the intermediate bearing member.

2. A stuffing box for a compressor including a crank case, a crank shaft mounted in a bearing in the crank case, three circular bearing members freely mounted upon the shaft exterior of the casing in contact with each other, a metallic bellows about the shaft connected at one end to the casing and at the other to the adjacent bearing member, a spring about the shaft within the bellows bearing against the casing and bearing member, a gear keyed upon the shaft, a spring about the shaft bearing against the gear and adjacent circular bearing member whereby the pressure of the outer circular bearing member is equalized upon the contacting surfaces of the intermediate circular bearing member, the circumference of the intermediate bearing member being toothed to form a gear, and a speed-reducing transmission interposed between the gear keyed on the shaft and the intermediate bearing member.

3. The structure of claim 2, wherein a casing surrounding the shaft stuffing box is secured upon the crank casing, and wherein the speed-reducing transmission includes a transmission shaft mounted parallel to the crank shaft in a bearing supported upon the stuffing box casing, and gears keyed at each end upon the transmission shaft, one of which meshes with the crank shaft gear and the other meshes with the intermediate bearing member.

4. A stuffing box for a compressor including a crank case, a crank shaft mounted in a bearing in the crank case, three circular bearing members freely mounted upon the shaft exterior of the casing in contact with each other, a metallic bellows about the shaft connected at one end to the casing and at the other to the adjacent bearing member, a spring about the shaft within the bellows bearing against the casing and bearing member, a recessed member keyed upon the shaft, a spring about the shaft bearing against the bottom of the recess and adjacent circular bearing member whereby the pressure of the outer circular bearing member is equalized upon the contacting surfaces of the intermediate circular bearing member, a casing surrounding the shaft stuffing box secured to the crank casing, the outer surface of said recessed member adjacent the intermediate circular bearing member providing an inner ball race, a plurality of ball bearings mounted to travel thereon in engagement with an outer ball race secured to the stuffing box casing, a ball retainer movable with the balls upon the rotation of the shaft, and means connecting the ball retainer to the intermediate circular bearing member, with the proportions of the balls and ball races so constructed as to provide a speed-reducing transmission from the crank shaft to the intermediate bearing member.

5. A stuffing box for a compressor including a crank case, a crank shaft mounted in a bearing in the crank case, three circular bearing members freely mounted upon the shaft exterior of the casing in contact with each other, a metallic bellows about the shaft connected at one end to the casing and at the other to the adjacent bearing member, a spring about the shaft within the bellows bearing against the casing and bearing member, a recessed member keyed upon the shaft, a spring about the shaft bearing against the bottom of the recess and adjacent circular bearing members whereby the pressure of the outer circular bearing member is equalized upon the contacting surfaces of the intermediate circular bearing member, a casing surrounding the shaft stuffing box secured to the crank casing, the outer surface of said recessed member adjacent the intermediate circular bearing member toothed to form an external gear, an internal ring gear spaced apart therefrom secured to the stuffing box casing in alignment therewith, a plurality of pinions interposed between the external gear and internal ring gear in mesh therewith, and pivots passing through the pinions secured to the intermediate circular bearing member with the proportions of the gears and pinions so constructed as to provide a speed-reducing transmission from the crank shaft to the intermediate bearing member.

WALTER W. WILLIAMS.